(12) United States Patent
Fu et al.

(10) Patent No.: US 10,511,843 B2
(45) Date of Patent: Dec. 17, 2019

(54) METHOD AND APPARATUS FOR LOOP FILTERING ACROSS SLICE OR TILE BOUNDARIES

(71) Applicant: HFI Innovation Inc., Zhubei, Hsinchu County (TW)

(72) Inventors: Chih-Ming Fu, Hsinchu (TW); Chia-Yang Tsai, New Taipei (TW); Chih-Wei Hsu, Taipei (TW); Ching-Yeh Chen, Taipei (TW); Yu-Wen Huang, Taipei (TW); Shaw-Min Lei, Hsinchu County (TW)

(73) Assignee: HFI Innovation Inc., Zhubei, Hsinchu County (TW)

( * ) Notice: Subject to any disclaimer, the term of this patent is extended or adjusted under 35 U.S.C. 154(b) by 559 days.

(21) Appl. No.: 14/380,710

(22) PCT Filed: Feb. 22, 2013

(86) PCT No.: PCT/CN2013/071761
§ 371 (c)(1),
(2) Date: Aug. 23, 2014

(87) PCT Pub. No.: WO2013/155897
PCT Pub. Date: Oct. 24, 2013

(65) Prior Publication Data
US 2015/0016506 A1 Jan. 15, 2015

Related U.S. Application Data

(60) Provisional application No. 61/624,812, filed on Apr. 16, 2012.

(51) Int. Cl.
*H04N 19/176* (2014.01)
*H04N 19/117* (2014.01)
(Continued)

(52) U.S. Cl.
CPC ......... *H04N 19/176* (2014.11); *H04N 19/117* (2014.11); *H04N 19/167* (2014.11); *H04N 19/174* (2014.11); *H04N 19/82* (2014.11)

(58) Field of Classification Search
CPC ........... G06K 9/00805; G06K 9/00798; G06K 9/00825; B60Q 9/008; G08G 1/166;
(Continued)

(56) References Cited

U.S. PATENT DOCUMENTS

2003/0219073 A1* 11/2003 Lee ...................... H04N 19/176
375/240.27
2006/0110062 A1* 5/2006 Chiang ................ H04N 19/117
382/260
(Continued)

FOREIGN PATENT DOCUMENTS

CN 101517909 A 8/2009
CN 102150428 A 8/2011
(Continued)

OTHER PUBLICATIONS

Chen, C.Y., et al.; CE8 Subset2: "A Joint Proposal on Improving the Adaptive Loop Filter in TMuC0.9 by MediaTek, Qualcomm, and Toshiba;" Joint Collaborative Team on Video Coding (JCT-VC) of ITU-T SG16 WP3 and ISO/IEC JTCC1/SC29/WG11; 4th Meeting; Jan. 2011; pp. 1-18.
(Continued)

*Primary Examiner* — Farhan Mahmud
(74) *Attorney, Agent, or Firm* — Oblon, McClelland, Maier & Neustadt, L.L.P.

(57) ABSTRACT

A method and apparatus for loop filter processing of video data in a video encoder or decoder are disclosed. Embodiments according to the present invention conditionally allow sharing of loop filter parameters. In one embodiment, sharing of loop filter information between the current block and
(Continued)

a neighboring block is determined according to a condition. If the condition indicates that sharing of loop filter information is allowed, a merge flag is coded and incorporated in the video bitstream in an encoder, and a merge flag is parsed from the video bitstream and decoded in a decoder. In one embodiment, the condition depends on region partitioning of the picture, where region partitioning partitions the picture into regions and the region may correspond to a slice or a tile. The condition is set to indicate that sharing of loop filter information is allowed if the block and the neighboring block are in a same slice/tile.

24 Claims, 7 Drawing Sheets

(51) Int. Cl.
*H04N 19/174* (2014.01)
*H04N 19/82* (2014.01)
*H04N 19/167* (2014.01)

(58) Field of Classification Search
CPC . G08G 1/167; G06T 2207/30252; G06T 5/40; B62D 13/06; B60R 2300/105; B60R 11/04; B60R 1/00; B60W 2420/42; B60W 50/14; H04N 5/2351
See application file for complete search history.

(56) References Cited

U.S. PATENT DOCUMENTS

| | | | |
|---|---|---|---|
| 2009/0002379 A1* | 1/2009 | Baeza | G06T 1/20 345/522 |
| 2009/0003446 A1* | 1/2009 | Wu | H04N 19/176 375/240.16 |
| 2009/0003447 A1* | 1/2009 | Christoffersen | H04N 19/61 375/240.16 |
| 2010/0021071 A1 | 1/2010 | Wittmann et al. | |
| 2010/0027686 A1* | 2/2010 | Zuo | G06T 9/00 375/240.29 |
| 2011/0274158 A1 | 11/2011 | Fu et al. | |
| 2012/0082244 A1* | 4/2012 | Chen | H04N 19/00103 375/240.29 |

FOREIGN PATENT DOCUMENTS

| | | |
|---|---|---|
| EP | 1944974 A1 | 7/2008 |
| WO | WO 2012/045269 | 4/2012 |

OTHER PUBLICATIONS

Lim, J., et al.; "Extended Merging Scheme Using Motion-Hypothesis Prediction;" Joint Collaborative Team on Video Coding (JCT-VC) of ITU-T SG16 WP3 and ISO/IEC JTCC1/SC29/WG11; 2nd Meeting; Jul. 2010; pp. 1-7.

* cited by examiner

90 EO

0 EO

135 EO

45 EO

METHOD AND APPARATUS FOR LOOP FILTERING ACROSS SLICE OR TILE BOUNDARIES

CROSS REFERENCE TO RELATED APPLICATIONS

The present invention claims priority to U.S. Provisional Patent Application No. 61/624,812, filed on Apr. 16, 2012, entitled "Prohibition against merging across slice/tile boundaries in SAO/ALF". The U.S. Provisional Patent Application is hereby incorporated by reference in its entirety.

BACKGROUND OF THE INVENTION

Field of the Invention

The present invention relates to video coding. In particular, the present invention relates to video coding techniques associated with loop filtering and processing across slice or tile boundaries.

Description of the Related Art

Motion estimation is an effective inter-frame coding technique to exploit temporal redundancy in video sequences. Motion-compensated inter-frame coding has been widely used in various international video coding standards. The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate a compressed video bitstream. During the encoding process, coding artifacts are introduced, particularly in the quantization process. In order to alleviate the coding artifacts, additional processing can be applied to reconstructed video to enhance picture quality in newer coding systems. The additional processing is often configured in an in-loop operation so that the encoder and the decoder may derive the same reference pictures.

FIG. 1 illustrates an exemplary adaptive inter/intra video coding system incorporating in-loop filtering process. For inter-prediction, Motion Estimation (ME)/Motion Compensation (MC) 112 is used to provide prediction data based on video data from other picture or pictures. Switch 114 selects Intra Prediction 110 or inter-prediction data from ME/MC 112 and the selected prediction data is supplied to Adder 116 to form prediction errors, also called prediction residues or residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image unit. The side information may also be processed by entropy coding to reduce required bandwidth. Accordingly, the side information data is also provided to Entropy Encoder 122 as shown in FIG. 1 (the motion/mode paths to Entropy Encoder 122 are not shown). When the inter-prediction mode is used, a previously reconstructed reference picture or pictures have to be used to form prediction residues. Therefore, a reconstruction loop is used to generate reconstructed pictures at the encoder end. Consequently, the transformed and quantized residues are processed by Inverse Quantization (IQ) 124 and Inverse Transformation (IT) 126 to recover the processed residues. The processed residues are then added back to prediction data 136 by Reconstruction (REC) 128 to reconstruct the video data. The reconstructed video data may be stored in Reference Picture Buffer 134 and be used for prediction of other frames.

As shown in FIG. 1, incoming video data undergoes a series of processing in the encoding system. The reconstructed video data from REC 128 may be subject to various impairments due to the series of processing. Accordingly, various loop processing is applied to the reconstructed video data before the reconstructed video data is used as prediction data in order to improve video quality. In the High Efficiency Video Coding (HEVC) standard being developed, Deblocking Filter (DF) 130, Sample Adaptive Offset (SAO) 131 and Adaptive Loop Filter (ALF) 132 have been developed to enhance picture quality. The Deblocking Filter (DF) 130 is applied to boundary pixels and the DF processing is dependent on the underlying pixel data and coding information associated with the corresponding blocks. There is no DF-specific side information needs to be incorporated in the video bitstream. On the other hand, the SAO and ALF processing are adaptive, where filter information such as filter parameters and filter type may be dynamically changed according to the underlying video data. Therefore, filter information associated with SAO and ALF is incorporated in the video bitstream so that a decoder can properly recover the required information. Furthermore, filter information from SAO and ALF is provided to Entropy Encoder 122 for incorporation into the bitstream. In FIG. 1, DF 130 is applied to the reconstructed video first; SAO 131 is then applied to DF-processed video; and ALF 132 is applied to SAO-processed video. However, the processing order among DF, SAO and ALF may be re-arranged. In the High Efficiency Video Coding (HEVC) video standard being developed, the loop filtering process includes DF and SAO.

The coding process in HEVC is applied to each Largest Coding Unit (LCU). The LCU is adaptively partitioned into coding units using quadtree. Therefore, the LCU is also called coding tree block (CTB). In each leaf CU, DF is performed for each 8×8 block and in HEVC Test Model Version 5.0 (HM-5.0), the DF is applied to the 8×8 block boundaries. For each 8×8 block, horizontal filtering across vertical block boundaries is first applied, and then vertical filtering across horizontal block boundaries is applied.

Sample Adaptive Offset (SAO) 131 is also adopted in HM-5.0, as shown in FIG. 1. SAO is regarded as a special case of filtering where the processing only applies to one pixel. To apply SAO, a picture may be divided into multiple LCU-aligned regions. Each region can select one SAO type among two Band Offset (BO) types, four Edge Offset (EO) types, and no processing (OFF). For each to-be-processed (also called to-be-filtered) pixel, BO uses the pixel intensity to classify the pixel into a band. The pixel intensity range is equally divided into 32 bands, as shown in FIG. 2. Four consecutive bands are grouped together, where the starting band is indicated by sao_band_position. An exemplary 4-band group 200 is illustrated in FIG. 2. The first band position of this 4-band group is indicated by arrow 210. In EO, pixel classification is first done to classify pixels into different groups (also called categories or classes). The pixel classification for each pixel is based on a 3×3 window, as shown in FIG. 3 where four configurations corresponding to 0°, 90°, 135°, and 45° are used for classification. Upon classification of all pixels in a picture or a region, one offset is derived and transmitted for each group of pixels. In HM-5.0, SAO is applied to luma and chroma components, and each of the luma components is independently processed. Similar to BO, one offset is derived for all pixels of each category except for category 4 of EO, where Category 4 is forced to use zero offset. Table 1 below lists the EO pixel classification, where "C" denotes the pixel to be classified.

TABLE 1

| Category | Condition |
|---|---|
| 0 | C < two neighbors |
| 1 | C < one neighbor && C == one neighbor |
| 2 | C > one neighbor && C == one neighbor |
| 3 | C > two neighbors |
| 4 | None of the above |

Adaptive Loop Filtering (ALF) 132 is another in-loop filtering in HM-5.0 to enhance picture quality, as shown in FIG. 1. Multiple types of luma filter footprints and chroma filter footprints are used. The ALF operation is applied in the horizontal direction first. After horizontal ALF is performed, ALF is applied in the vertical direction. In HM-5.0, up to sixteen luma ALF filters and at most one chroma ALF filter can be used for each picture. In order to allow localization of ALF, there are two modes for luma pixels to select filters. One is a Region-based Adaptation (RA) mode, and the other is a Block-based Adaptation (BA) mode. In addition to the RA and BA for adaptation mode selection at picture level, Coding Units (CUs) larger than a threshold can be further controlled by filter usage flags to enable or disable ALF operations locally. As for the chroma components, since they are relatively flat, no local adaptation is used in HM-5.0, and the two chroma components of a picture share the same filter. In MH-5.0, an ALF filter for a region may be selected from multiple ALF filters. In addition, multiple filter footprints are used in HM-5.0. For each ALF filter, there is a set of filter coefficients associated with the filter. Therefore, the ALF information comprises identification for the selected ALF filter, the filter footprint and filter coefficients.

As shown in FIG. 1, DF 130 is applied to reconstructed pixels from REC 128. SAO 131 is then applied to DF-processed pixels and ALF 132 is applied to SAO-processed pixels. While the processing sequence illustrated in FIG. 1 is DF, SAO and ALF, other processing sequence may also be used. For example, SAO may be applied to reconstructed pixels from REC 128, DF-processed reconstructed pixels (i.e., DF applied to the reconstructed pixels), ALF-processed reconstructed pixels (i.e., ALF applied to reconstructed pixels), both DF-processed and ALF-processed pixels (i.e., DF applied to the reconstructed pixels and ALF applied to the DF-processed reconstructed pixels) or both ALF-processed and DF-processed pixels (i.e., ALF applied to the reconstructed pixels and DF applied to the ALF-processed reconstructed pixels). For convenience, the "processed-reconstructed pixels" may refer to any type of the processed pixels mentioned above during SAO processing. The "processed-reconstructed pixels" also includes the reconstructed pixels from REC 128. In this case, it can be considered that a null processing is applied to the reconstructed pixels from REC 128. Similarly, the "processed-reconstructed pixels" may also refer to various types of the processed pixels by DF, SAO, both DF and SAO or both SAO and DF during ALF processing. Again, for ALF processing, the "processed-reconstructed pixels" also includes the reconstructed pixels from REC 128.

To reduce side-information associated with SAO processing, SAO information of a current LCU can reuse the SAO information of a neighboring LCU above or to the left of the current LCU. The SAO information sharing is indicated by merge syntax. In HM-8.0, SAO syntax consists of sao_merge_left_flag, sao_merge_up_flag, sao_type_idx_luma, sao_type_index_chroma, sao_eo_class_luma, sao_eo_class_chroma, sao_band_position, sao_offset_abs, and sao_offset_sign, as shown in Table 2. Syntax sao_merge_left_flag indicates whether the current LCU reuses the SAO parameters of the left LCU. Syntax sao_merge_up_flag indicates whether the current LCU reuses the SAO parameters of the upper LCU. Syntax sao_type_idx represents the selected SAO type (sao_type_idx_luma and sao_type_idx_chroma for luma component and chroma component respectively). Syntax sao_offset_abs represents the offset magnitude and syntax sao_offset_sign represents the offset sign. Syntax cIdx indicates one of three color components. Similar mechanism can also be used to allow neighboring blocks to share the same ALF information.

TABLE 2

| | Descriptor |
|---|---|
| sao( rx, ry ){ | |
|   if( rx > 0 ) { | |
|     leftCtbInSliceSeg = CtbAddrInSliceSeg > 0 | |
|     leftCtbInTile = ( TileId[ CtbAddrInTS ] | |
|         == TileId[ CtbAddrRStoTS[ CtbAddrInRS − 1 ] ] ) | |
|     if( leftCtbInSliceSeg && leftCtbInTile ) | |
|       sao_merge_left_flag | ae(v) |
|   } | |
|   if( ry > 0 && !sao_merge_left_flag ) { | |
|     upCtbInSliceSeg = ( CtbAddrInRS − PicWidthInCtbsY ) >= slice_segment_address | |
|     upCtbInTile = ( TileId[ CtbAddrInTS ] == | |
| TileId[ CtbAddrRStoTS[ CtbAddrInRS − PicWidthInCtbsY ] ] ) | |
|     if( upCtbInSliceSeg && upCtbInTile ) | |
|       sao_merge_up_flag | ae(v) |
|   } | |
|   if( !sao_merge_up_flag && !sao_merge_left_flag ) { | |
|     for( cIdx = 0; cIdx < 3; cIdx++ ) { | |
|       if( ( slice_sao_luma_flag && cIdx == 0 ) \|\| | |
|         ( slice_sao_chroma_flag && cIdx > 0 ) ) { | |
|         if( cIdx == 0 ) | |
|           sao_type_idx_luma | ae(v) |
|         else if( cIdx == 1 ) | |
|           sao_type_idx_chroma | ae(v) |

TABLE 2-continued

| | Descriptor |
|---|---|
| ```
if( SaoTypeIdx[ cIdx ][ rx ][ ry ] != 0 ) {
    for( i = 0; i < 4; i++ )
        sao_offset_abs[ cIdx ][ rx ][ ry ][ i ]
    if( SaoTypeIdx[ cIdx ][ rx ][ ry ] = = 1 ) {
        for( i = 0; i < 4; i++ )
            if( sao_offset_abs[ cIdx ][ rx ][ ry ][ i ] != 0 )
                sao_offset_sign[ cIdx ][ rx ][ ry ][ i ]
        sao_band_position[ cIdx ][ rx ][ry ]
    } else {
        if( cIdx = = 0 )
            sao_eo_class_luma
        if( cIdx = = 1 )
            sao_eo_class_chroma
    }
   }
  }
 }
}
``` | ae(v)<br><br><br><br><br><br>ae(v)<br>ae(v)<br><br><br>ae(v)<br><br>ae(v) |

The LCUs in a picture can be partitioned into slices, where each slice consists of multiple horizontally consecutive LCUs. In HM-5.0, another image unit structure, named tile, is introduced, where a picture is partitioned into multiple tiles. For example, a picture may be divided into M tiles horizontally and N tiles vertically, where M and N are integers greater than 0. Each tile consists of multiple LCUs. Within each tile, the processing sequence of the LCUs is according to the raster scan order. Within each picture, the processing sequence of the tiles is also according to the raster scan order. Tile boundaries are often aligned with LCU boundaries.

In some systems, it is desirable to process the slices or tiles independently. Independent slice/tile processing will allow parallel processing of multiple slices or tiles. For CTBs or LCUs located at a left boundary or a top boundary of the slice or tile, SAO or ALF parameter sharing with a neighboring LCU above or to the left of the current LCU implies data dependency on an LCU from another slice or tile. Therefore, it is desirable to develop SAO or ALF processing that enables slice/tile independent processing.

BRIEF SUMMARY OF THE INVENTION

A method and apparatus for loop filter processing of video data in a video encoder or decoder are disclosed. Embodiments according to the present invention conditionally allow sharing of loop filter parameters. According to one embodiment of the present invention, sharing of loop filter information between the current block and a neighboring block is determined according to a condition. If the condition indicates that sharing of loop filter information is allowed, a merge flag is coded and incorporated in the video bitstream in an encoder or a merge flag is parsed from the video bitstream and decoded in a decoder. The merge flag may be a merge-left flag or a merge-up flag. The merge-left flag is used if the neighboring block is adjacent to the left side of the current block and the merge-up flag is used if the neighboring block is adjacent to the upper side of the current block.

One aspect of the invention addresses the condition regarding whether to allow sharing of loop filter information. In one embodiment, the condition depends on region partitioning of the picture, where region partitioning partitions the picture into regions. For example, the region may correspond to a slice or a tile. The condition is set to indicate that sharing of loop filter information is allowed if the current block and the neighboring block are in a same region. The condition is set to indicate that sharing of loop filter information is disallowed if the current block and the neighboring block are in different regions or if the neighboring block is not available. In another embodiment, the condition depends on whether the neighboring block is available. The condition is set to indicate that sharing of loop filter information is allowed if the neighboring block is available. On the other hand, the condition is set to indicate that sharing of loop filter information is disallowed if the neighboring block is not available. When the condition is set to indicate that sharing of loop filter information is disallowed, an encoder does not incorporate the merge flag in the video bitstream and a decoder does not parse the merge flag from the video bitstream.

The block may correspond to a coding tree block or a largest coding unit (LCU). The loop filter information may correspond to SAO (sample adaptive offset) information, ALF (adaptive loop filter) information, or DF (deblocking filter) information. The SAO information may comprise SAO type information, SAO offset values, edge offset type, band offset starting band position, offset magnitude, and offset sign. The ALF information may comprise ALF filter coefficients, ALF filter shape, filter selection index, filter classification method, and filter on/off control flag. Whether to allow sharing of loop filter information can be enabled or disabled based on a control flag. The control flag may be in slice header, picture parameter set, adaptation parameters set, sequence parameters set, or video parameter set of the video bitstream.

DETAILED DESCRIPTION OF THE INVENTION

In order to allow independent slice/tile processing for systems with loop filters such as SAO, ALF, and DF, embodiments according to the present invention conditionally allow sharing of loop filter information. As mentioned before, the SAO processing incorporates merge syntax to allow SAO parameter sharing between neighboring LCUs. It is also possible to use similar syntax to allow ALF parameter sharing between neighboring LCUs. The present invention removes the data dependency associated with sharing of SAO, ALF, or DF information at slice/tile boundaries to allow independent slice/tile-based processing. If a block (a CTB or LCU) and an adjacent left block are within a same slice or tile, sharing of SAO, ALF, or DF information will be allowed. Similarly, if a block and an adjacent upper block are within a same slice or tile, sharing of SAO, ALF, or DF information will be allowed. When sharing of loop filter information is allowed, a merge flag (merge-left or merge-up) will be coded in an encoder according to whether the current block shares (or re-use) the loop filter information with the neighboring block. The coded merge flag will be incorporated in the video bitstream. In the decoder side, the merge flag will be parsed and used for decoding. If the block is located at the left-side boundary or the top-side boundary of a slice/tile, sharing of loop filter information with an adjacent left block or upper block respectively would require the loop filter information from another slice or tile. Therefore, sharing of loop filter information is disallowed in this case. When sharing of loop filter information is disallowed, the merge flag (either merge-left or merge-up) will not be used. Accordingly, an encoder will not code the merge flag nor incorporate the merge flag in the video bitstream. At the decoder side, there is no need to parse the merge flag. Accordingly, side information associated with the respective merge flag can be saved.

Figure 4A:
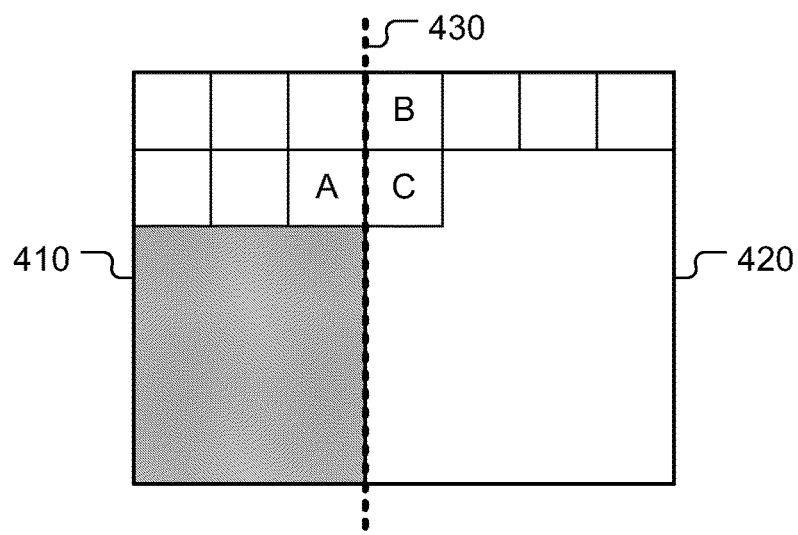
FIG. 4A illustrates a vertical slice/tile boundary where two neighboring blocks belong to two different slices/tiles.
Figure 4B:
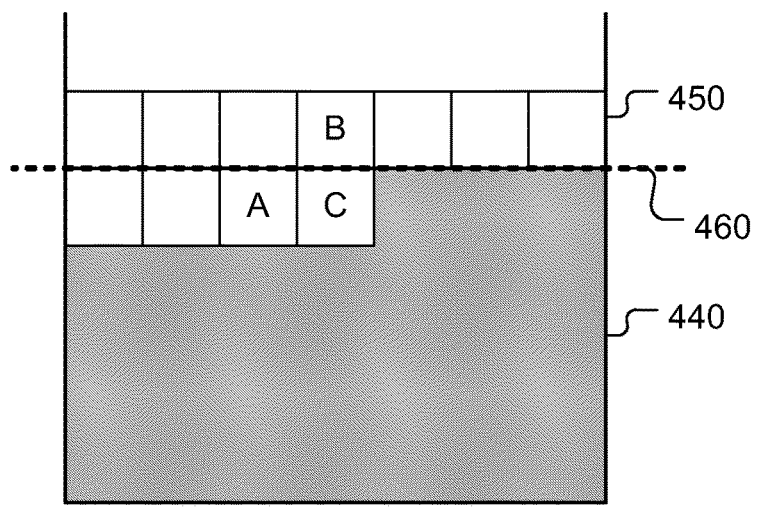
FIG. 4B illustrates a horizontal slice/tile boundary where two neighboring blocks belong to two different slices/tiles.

Examples of slice/tile independent processing are shown in FIG. 4A and FIG. 4B. FIG. 4A illustrates a vertical boundary 430 between tile 410 and tile 420. For block C (i.e., LCU C) at the left-side boundary of tile 420, no merge-left is allowed for loop filter information sharing because block C and its neighboring block A belong to different tiles. FIG. 4B illustrates an example of a horizontal slice/tile boundary 460 between slice/tile 440 and slice/tile 450. For block C at the top-side boundary of the slice/tile, no merge-up is allowed for loop filter information sharing because block C and its neighbor block B belong to different slices/tiles.

Figure 1:
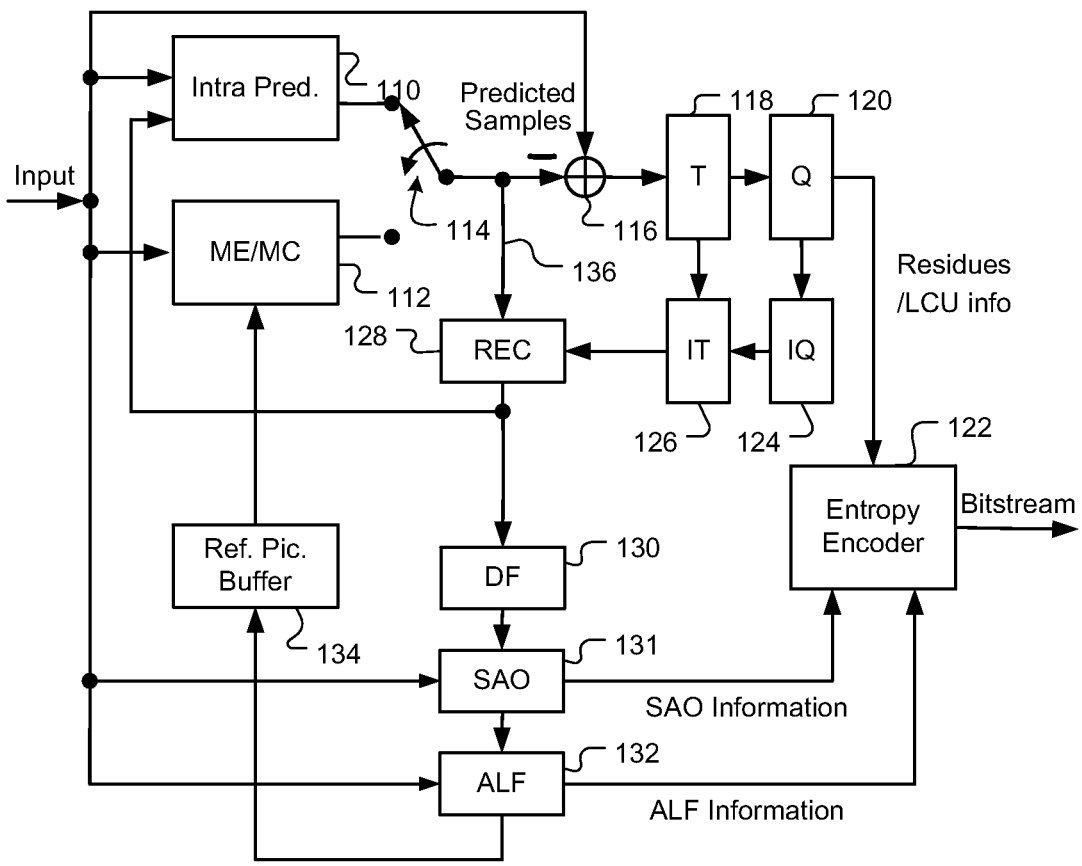
FIG. 1 illustrates an exemplary video coding system using Inter/Intra prediction, where loop filter processing, including Deblocking Filter (DF), Sample Adaptive Offset (SAO) and Adaptive Loop Filter (ALF) is incorporated.
Figure 2:
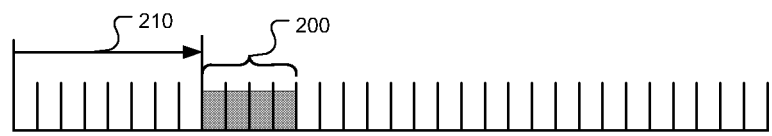
FIG. 2 illustrates an example of Band Offset (BO) by equally dividing the pixel intensity range into 32 bands.
Figure 3:
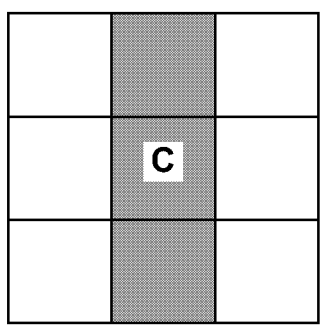
FIG. 3 illustrates Edge Offset (EO) pixel classification based on a 3×3 window, with four configurations corresponding to 0°, 90°, 135°, and 45°.
Figure 3:
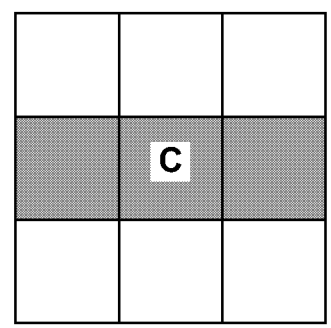
Figure 3:
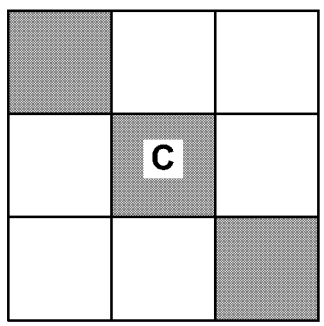
Figure 3:
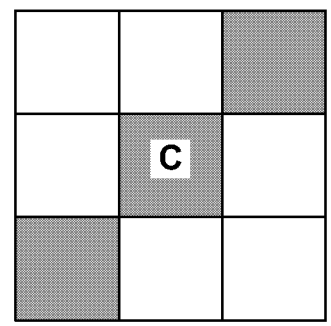
Figure 5:
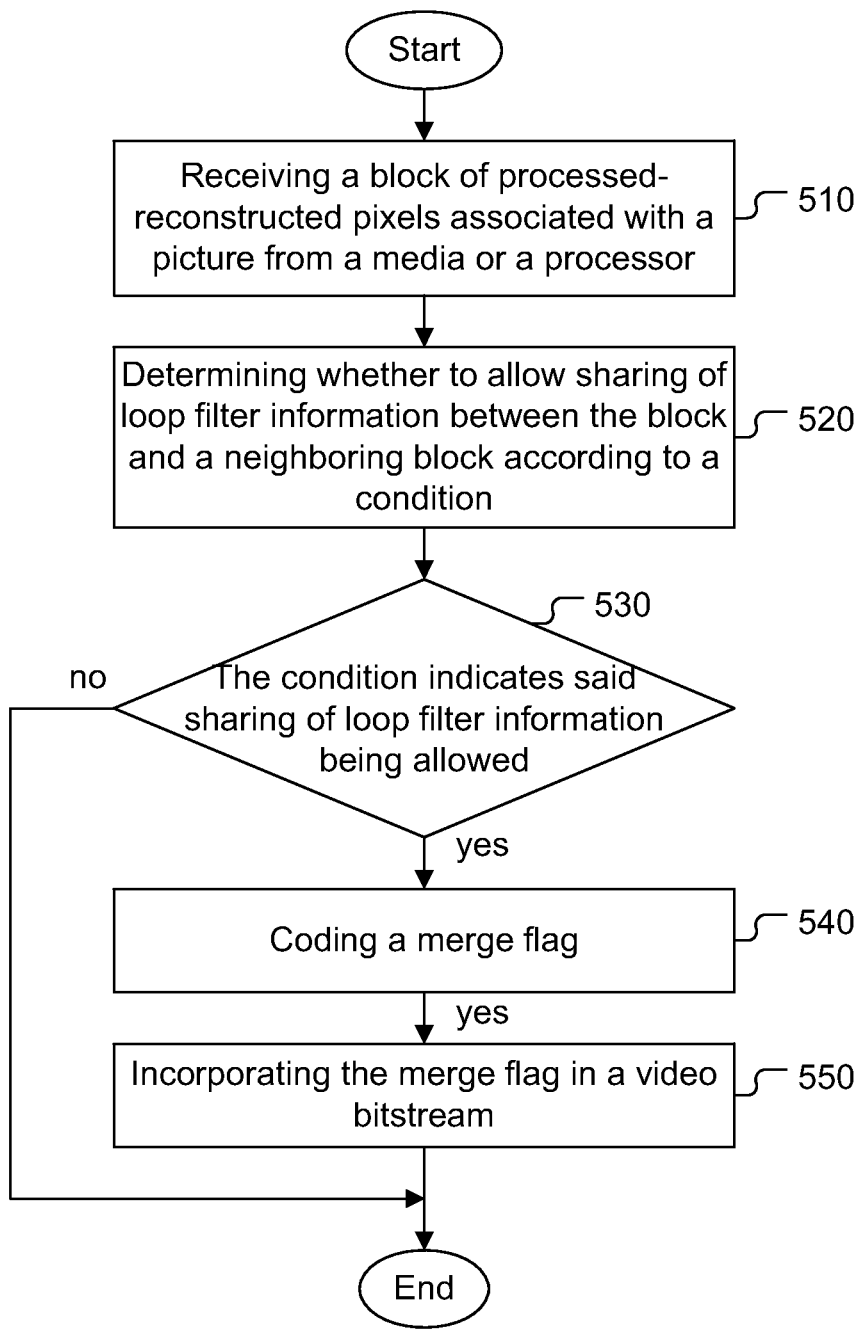
FIG. 5 illustrates an exemplary flowchart of sharing loop filter information conditionally for a video encoder incorporating an embodiment of the present invention.

FIG. 5 illustrates an exemplary flowchart of sharing loop filter information conditionally for a video encoder incorporating an embodiment of the present invention. As shown in FIG. 1 and described in associated text, loop processing (DF, SAO or ALF) is always applied to reconstructed pixels. Furthermore, as mentioned before, the processed-reconstructed pixels may refer to various types of processed reconstructed pixels. A current block of processed-reconstructed pixels is received from a media or a processor as shown in step 510. The processed-reconstructed pixels may be stored in a media such as a RAM or DRAM in a system. Therefore, the processed-reconstructed pixels will have to be read back from a media. Also it is possible that the loop filter processing receives processed-reconstructed pixels directly from another processor (such as a central processing unit, a controller or a digital signal processor) responsible to generate the processed-reconstructed pixels. In this case, the processed-reconstructed pixels will be received from a processor. The block can be a coding tree block (CTB), an LCU or other block unit (such as macroblock or other types). A decision is made in step 520 to determine whether to allow sharing of loop filter information between the current block and a neighboring block according to a condition. The condition is checked in step 530. If the condition indicates that sharing of loop filter information is allowed, a merge flag is coded (step 540) and the merge flag is incorporated in the video bitstream (step 550). Otherwise, steps 540 and 550 are skipped and no side information for the merge flag is incorporated in the video bit stream.

The neighboring block may not be available in some cases. For example, the current block may be located at the boundary of a picture. A respective neighboring block to the left or on the top of the current block may not exist since the respective neighboring block would be outside the picture. In this case, sharing of loop filter parameters will be disallowed. The loop filter information may correspond to SAO information, ALF information or DF information. The SAO information may comprise SAO type information, SAO offset values, edge offset type, band offset starting band position, offset magnitude, and offset sign. The ALF information may comprise ALF filter coefficients, ALF filter shape, filter selection index, filter classification method, and filter on/off control flag. In one embodiment, the condition depends on region partitioning of the picture, where the picture is partitioned into regions and the region may correspond to a slice or a tile. In slice/tile based loop-filter processing, the condition is set to indicate that sharing of loop filter information is allowed if the current block and the neighboring block are in a same slice/tile. On the other hand, the condition is set to indicate that sharing of loop filter information is disallowed if the block and the neighboring block are in different slices/tiles or if the neighboring block is not available. When sharing of loop filter information is disallowed, there is no need to code the merge flag or to incorporate the merge flag in the video bitstream. Accordingly, side information for the associated merge flags can be saved. This feature is useful even for non-slice/tile based loop filter processing. In another embodiment, the picture is not partitioned into regions and the condition depends on whether the neighboring block is available. The condition is set to indicate that sharing of loop filter information is allowed if the neighboring block is available. On the other hand, the condition is set to indicate that sharing of loop filter information is disallowed if the neighboring block is not available.

The conditional sharing of loop filter information between the current block and the neighboring block according to the condition can be enabled or disabled based on a control flag. The control flag can be incorporated in the slice header, picture parameter set, adaptation parameters set, sequence parameters set, or video parameter set of the video bitstream.

Figure 6:
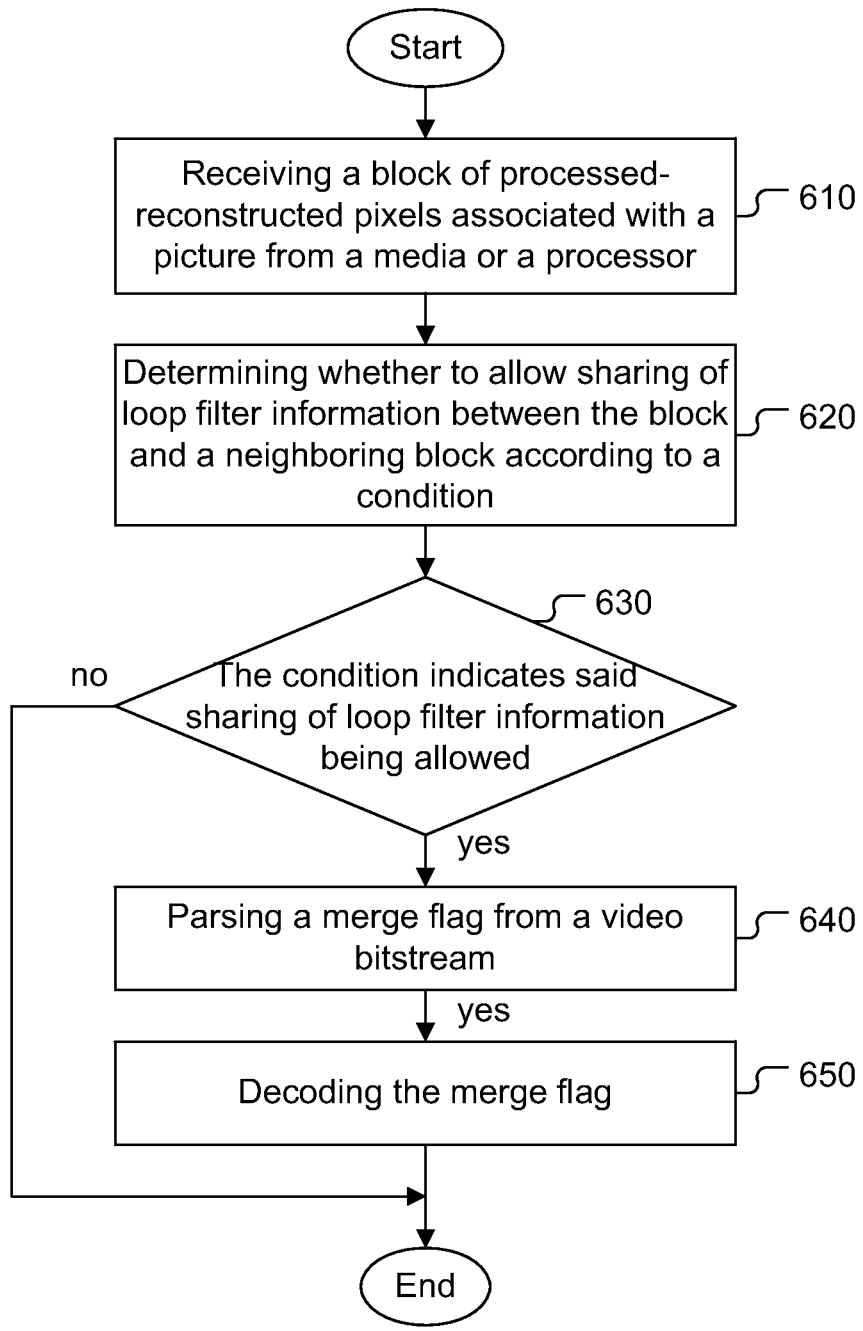
FIG. 6 illustrates an exemplary flowchart of sharing loop filter information conditionally for a video decoder incorporating an embodiment of the present invention.

FIG. 6 illustrates an exemplary flowchart of sharing loop filter information conditionally for a video decoder incorporating an embodiment of the present invention. A current block of processed-reconstructed pixels is received from a media or a processor as shown in step 610. A decision is made in step 620 to determine whether to allow sharing of loop filter information between the current block and a neighboring block according to a condition. The condition is checked in step 630. If the condition indicates that sharing of loop filter information is allowed, a merge flag is parsed from the video bitstream (step 640) and the merge flag is decoded (step 650). Otherwise, steps 640 and 650 are skipped.

In the case that the neighboring block is not available, sharing of loop filter parameters will be disallowed. In a decoder, the decision regarding whether sharing of loop filter information is allowed is the same as that for the encoder. When sharing of loop filter information is disallowed, there is no need to parse the merge flag from the video bitstream or to decode the merge flag.

The conditional sharing of loop filter information between the current block and the neighboring block according to the condition can be enabled or disabled based on a control flag. The control flag can be parsed from the slice header, picture parameter set, adaptation parameters set, sequence parameters set, or video parameter set of the video bitstream.

Figure 7:
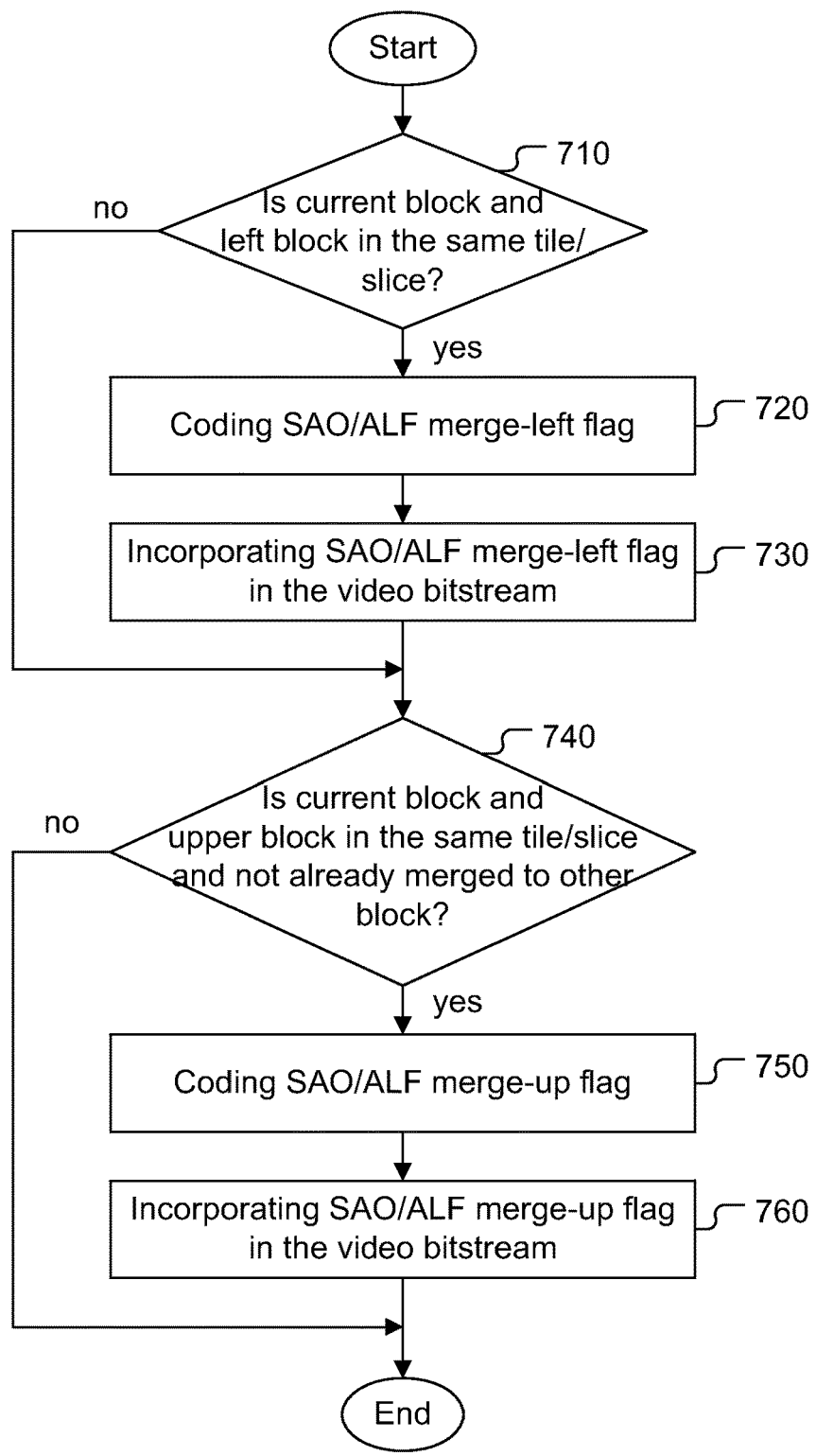
FIG. 7 illustrates an exemplary flowchart of coding SAO/ALF merge flag conditionally for a block in a slice/tile incorporating an embodiment of the present invention.

A flowchart for slice/tile based SAO/ALF processing at the encoder side incorporating an embodiment of the present invention is shown in FIG. 7. A decision is made in step 710 to determine whether the current block and its neighboring block adjacent to the left side of the current block are in the same tile/slice. If the current block and the neighboring block adjacent to the left side of the current block are within the same slice/tile, the coding process for the SAO/ALF merge-left flag is performed as shown in step 720 and the coded merge-left flag is then incorporated in the video bitstream as shown in step 730. Otherwise, steps 720 and 730 are skipped and no side information for the merge-left flag is needed. When the neighboring block adjacent to the left side of the current block is not available (for example, the current block being a boundary block at the left side of a slice/tile and the slice/tile is located at the left side boundary of a picture), the decision in step 710 will also take the "no" branch. In step 720, the SAO/ALF merge-left flag is coded according to whether the two respective blocks share loop filter information. The value of the SAO/ALF merge-left flag is indicative of whether the current block shares SAO/ALF parameters with the left neighboring block.

Similar process is applied to determine whether to allow merge-up flag for a current block to share loop filter information with a neighboring block adjacent to the top side of the current block as shown in step 740. If the current block and the neighboring block adjacent to the top side of the current block are in the same tile/slice, sharing of loop filter information is allowed. In this case, the coding process for the SAO/ALF merge-up flag is performed as shown in step 750 and the merge-up flag coded is then incorporated in the video bitstream as shown in step 760. Otherwise, steps 750 and 760 are skipped and no side information for the merge-up flag is needed. When the neighboring block adjacent to the top side of the current block is not available (for example, the current block being a boundary block at the top side of a slice/tile and the slice/tile is located at the top side boundary of a picture), the decision in step 740 will also take the "no" branch. In step 740, if the current block is already merged to other block (i.e. left block), no merge-up processing or flag is needed. In step 750, the SAO/ALF merge-up flag is coded according to whether the two respective blocks share loop filter information. The value of the SAO/ALF merge-up flag is indicative of whether the current block shares SAO/ALF parameters with the upper neighboring block.

The exemplary flowchart shown in FIG. 7 is for illustration purpose. A skilled person in the art may re-arrange, combine steps or split a step to practice the present invention without departing from the spirit of the present invention. For example, the merge-up flag can be checked first and then the merge-left flag. In this case, steps 740 through 760 are performed before steps 710 through 730. In another example, the decision process for merge-left flag and merge-up flag can be performed first. After both merge-left flag and merge-up flag are determined, the two flags are coded and incorporated in the video bitstream.

Figure 8:
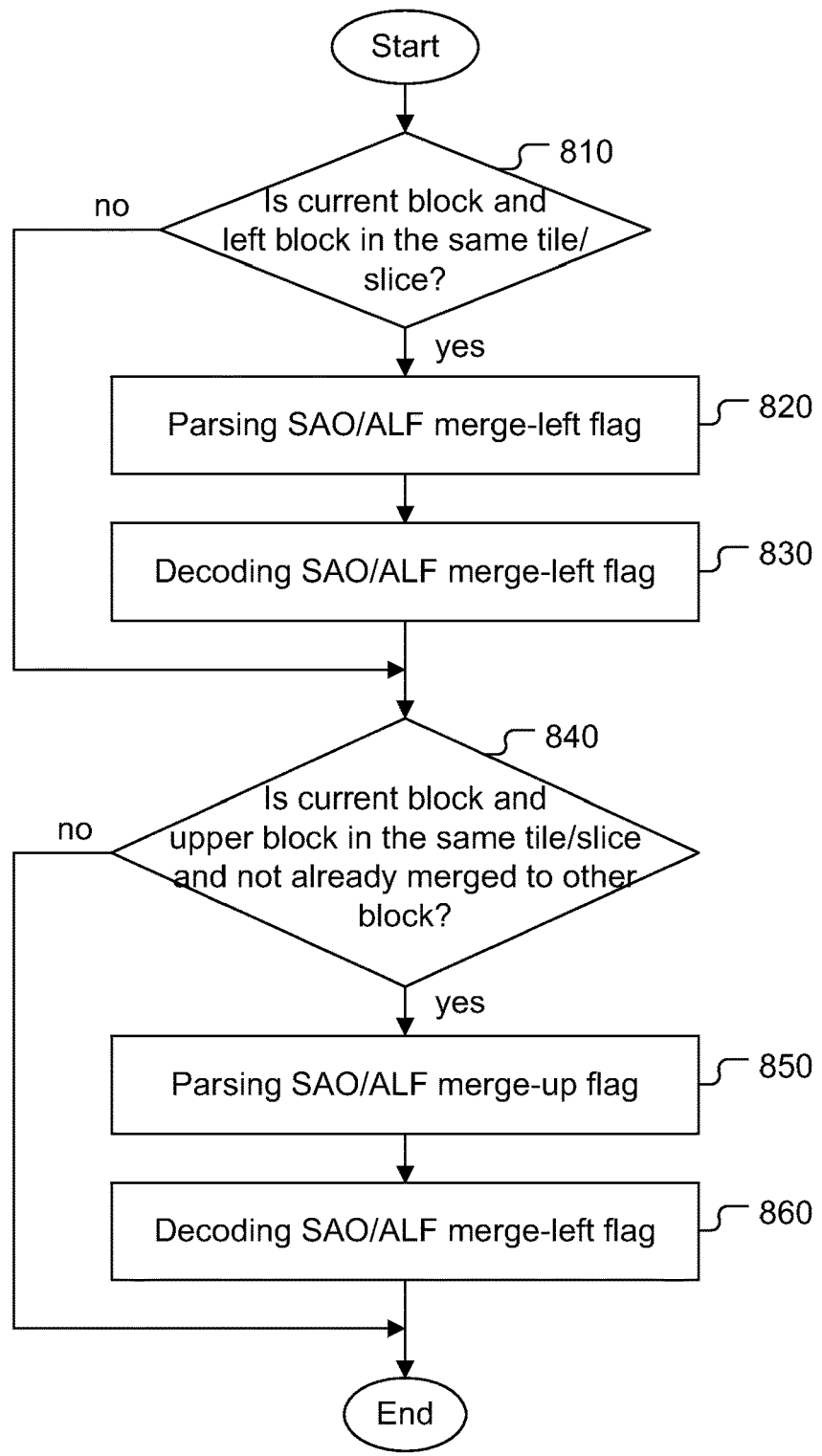
FIG. 8 illustrates an exemplary flowchart of parsing SAO/ALF merge flag conditionally for a block in a slice/tile incorporating an embodiment of the present invention.

A flowchart for slice/tile based SAO/ALF processing at the decoder side incorporating an embodiment of the present invention is shown in FIG. 8. A decision is made in step 810 to determine whether the current block and its neighboring block adjacent to the left side of the current block are in the same tile/slice. If the current block and the neighboring block adjacent to the left side of the current block are within the same slice/tile, the parsing process to extract the SAO/ALF merge-left flag is performed as shown in step 820 and the merge-left flag is decoded in step 830. Otherwise, steps 820 and 830 are skipped. When the neighboring block adjacent to the left side of the current block is not available, the decision in step 810 will also take the "no" branch. Similar process is applied to check whether to allow merge-up flag for a current block to share loop filter information with a neighboring block adjacent to the top side of the current block as shown in step 840. In step 840, if the current block is already merged to other block (i.e. left block), no merge-up flag needs to be parsed and decoded. If the current block and the neighboring block adjacent to the top side of the current block are in the same tile/slice, sharing of loop filter information is allowed. In this case, the parsing process to extract the SAO/ALF merge-up flag is performed as shown in step 850 and the merge-up flag is decoded in step 860. Otherwise, steps 850 and 860 are skipped. When the neighboring block adjacent to the top side of the current block is not available, the decision in step 840 will also take the "no" branch.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for loop filter processing of video data in a video decoder, the method comprising:
    receiving a current block of processed-reconstructed pixels associated with a picture from a media or a processor, wherein the picture is partitioned into a plurality of slices or tiles by a plurality of region boundaries;
    identifying a neighboring block directly adjacent to the current block, wherein the neighboring block is directly adjacent to a left side of the current block or an upper side of the current block;
    identifying a first one of the plurality of slices or tiles comprising the current block, and a second one of the plurality of slices or tiles comprising the neighboring block;
    when the first one of the plurality of slices or tiles is different from the second one of the plurality of slices or tiles, determining sharing of loop filter information between the current block and the neighboring block is not allowed independent of any parameters that are shared between the current block and the neighboring block;
    when the first one of the plurality of slices or tiles is identical to the second one of the plurality of slices or tiles, determining sharing of the loop filter information between the current block and the neighboring block is allowed independent of any parameters that are shared between the current block and the neighboring block; and
    parsing a merge flag from a video bitstream and decoding the merge flag only if sharing of the loop filter information is determined to be allowed, wherein the merge flag indicates whether the loop filter information is shared between the current block and the neighboring block.

2. The method of claim 1, wherein the merge flag consists of a merge-left flag and a merge-up flag.

3. The method of claim 2, wherein the merge-left flag is used if the neighboring block is adjacent to left side of the block.

4. The method of claim 2, wherein the merge-up flag is used if the neighboring block is adjacent to upper side of the block.

5. The method of claim 2, wherein the merge-up flag is used if merge-left flag indicated said sharing of loop filter information being not allowed.

6. The method of claim 1, wherein said region partitions the picture into regions and the region corresponds to a slice or a tile.

7. The method of claim 1, wherein said sharing of loop information is further based on a condition that is set to indicate said sharing of loop filter information being disallowed if the block and the neighboring block are in different regions or if the neighboring block is not available.

8. The method of claim 1, wherein the block corresponds to a coding tree block or a largest coding unit (LCU).

9. The method of claim 1, wherein the loop filter information corresponds to SAO (sample adaptive offset) information, ALF (adaptive loop filter) information, or DF (deblocking filter) information.

10. The method of claim 9, wherein the SAO information comprises SAO type information, SAO offset values, edge offset type, band offset starting band position, offset magnitude, and offset sign.

11. The method of claim 9, wherein the ALF information comprises filter coefficients, and filter shape, filter selection index, filter classification method, and filter on/off control flag.

12. The method of claim 1, wherein said determining whether to allow sharing of loop filter information between the block and the neighboring block is enabled or disabled based on a control flag.

13. The method of claim 12, wherein the control flag is parsed from slice header, picture parameter set, adaptation parameters set, sequence parameters set, or video parameter set of the video bitstream.

14. A method for loop filter processing of video data in a video encoder, the method comprising:
    receiving a current block of processed-reconstructed pixels associated with a picture from a media or a processor, wherein the picture is partitioned into a plurality of slices or tiles by a plurality of region boundaries;
    identifying a neighboring block directly adjacent to the current block, wherein the neighboring block is directly adjacent to a left side of the current block or an upper side of the current block;
    identifying a first one of the plurality of slices or tiles comprising the current block, and a second one of the plurality of slices or tiles comprising the neighboring block;
    when the first one of the plurality of slices or tiles is different from the second one of the plurality of slices or tiles, not allowing sharing of loop filter information between the current block and the neighboring block independent of any parameters that are shared between the current block and the neighboring block;
    when the first one of the plurality of slices or tiles is identical to the second one of the plurality of slices or tiles, allowing sharing of the loop filter information between the current block and the neighboring block independent of any parameters that are shared between the current block and the neighboring block; and
    coding a merge flag and incorporating the merge flag in a video bitstream only if sharing of the loop filter information is allowed, wherein the merge flag indicates whether the loop filter information is shared between the current block and the neighboring block.

15. The method of claim 14, wherein the merge flag consists of a merge-left flag and a merge-up flag.

16. The method of claim 15, wherein the merge-up flag is used if merge-left flag indicated said sharing of loop filter information being not allowed.

17. The method of claim 14, wherein said region partitions the picture into regions and the region corresponds to a slice or a tile.

18. The method of claim 14, wherein said sharing of loop information is further based on a condition that is set to indicate said sharing of loop filter information being disallowed if the block and the neighboring block are in different regions or if the neighboring block is not available.

19. The method of claim 14, wherein the block corresponds to a coding tree block or a largest coding unit (LCU).

20. The method of claim 14, wherein the loop filter information corresponds to SAO (sample adaptive offset) information, ALF (adaptive loop filter) information, or DF (deblocking filter) information.

21. The method of claim 14, wherein said sharing of loop filter information between the block and the neighboring block is enabled or disabled based on a control flag.

22. The method of claim 21, wherein the control flag is incorporated in slice header, picture parameter set, adaptation parameters set, sequence parameters set, or video parameter set of the video bitstream.

23. An apparatus for loop filter processing of video data in a video decoder, the apparatus comprising:
processing circuitry configured to:
receive a current block of processed-reconstructed pixels associated with a picture from a media or a processor, wherein the picture is partitioned into a plurality of slices or tiles by a plurality of region boundaries;
identify a neighboring block directly adjacent to the current block, wherein the neighboring block is directly adjacent to a left side of the current block or an upper side of the current block;
identify a first one of the plurality of slices or tiles comprising the current block, and a second one of the plurality of slices or tiles comprising the neighboring block;
when the first one of the plurality of slices or tiles is different from the second one of the plurality of slices or tiles, determine sharing of loop filter information between the current block and the neighboring block is not allowed independent of any parameters that are shared between the current block and the neighboring block;
when the first one of the plurality of slices or tiles is identical to the second one of the plurality of slices or tiles, determine sharing of the loop filter information between the current block and the neighboring block is allowed independent of any parameters that are shared between the current block and the neighboring block; and
parse a merge flag from a video bitstream and decoding the merge flag only if sharing of the loop filter information is determined to be allowed, wherein the merge flag indicates whether the loop filter information is shared between the current block and the neighboring block.

24. An apparatus for loop filter processing of video data in a video encoder, the apparatus comprising:
processing circuitry configured to:
receive a current block of processed-reconstructed pixels associated with a picture from a media or a processor, wherein the picture is partitioned into a plurality of slices or tiles by a plurality of region boundaries;
identify a neighboring block directly adjacent to the current block, wherein the neighboring block is directly adjacent to a left side of the current block or an upper side of the current block;
identify a first one of the plurality of slices or tiles comprising the current block, and a second one of the plurality of slices or tiles comprising the neighboring block;
when the first one of the plurality of slices or tiles is different from the second one of the plurality of slices or tiles, not allow sharing of loop filter information between the current block and the neighboring block independent of any parameters that are shared between the current block and the neighboring block;
when the first one of the plurality of slices or tiles is identical to the second one of the plurality of slices or tiles, allow sharing of the loop filter information between the current block and the neighboring block independent of any parameters that are shared between the current block and the neighboring block; and
code a merge flag and incorporating the merge flag in a video bitstream only if sharing of the loop filter information is allowed, wherein the merge flag indicates whether the loop filter information is shared between the current block and the neighboring block.

* * * * *